June 2, 1959  B. A. GRAHAM  2,888,899
INDEX MARKER
Filed May 16, 1955
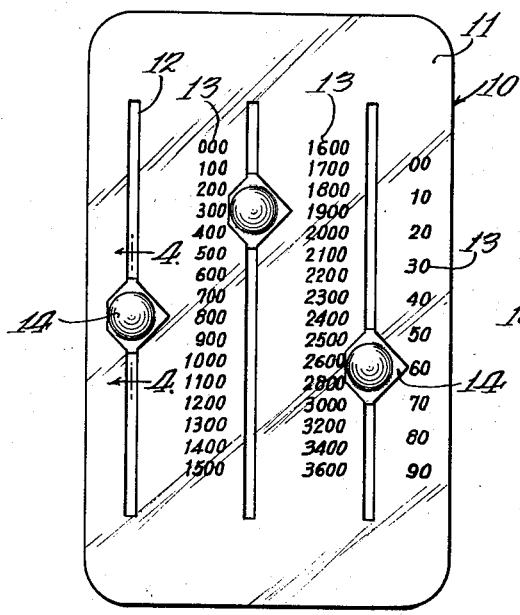
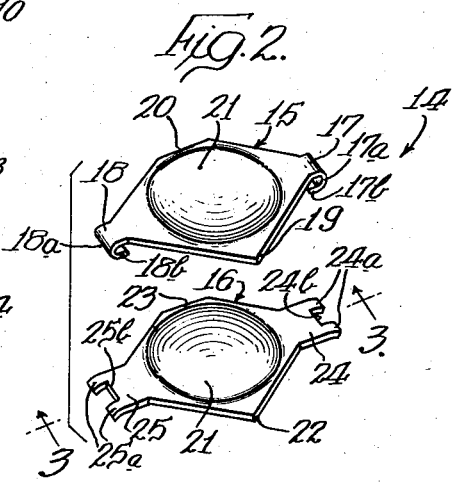
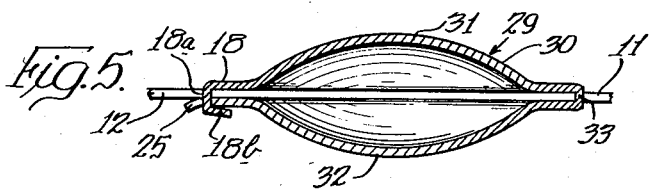
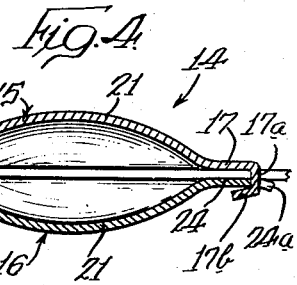
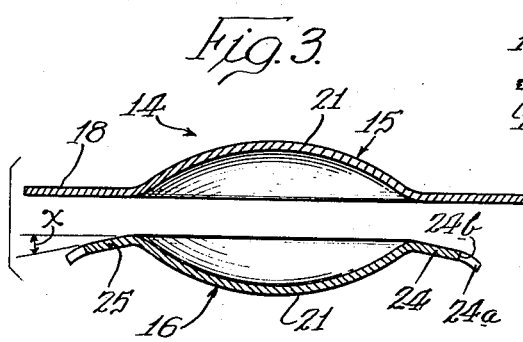
INVENTOR.
Bernard A. Graham
BY
George R. Clark
Atty.

United States Patent Office 2,888,899
Patented June 2, 1959

2,888,899

INDEX MARKER

Bernard A. Graham, Hinsdale, Ill., assignor to Sunbeam Corporation, Chicago, Ill., a corporation of Illinois Application May 16, 1955, Serial No. 508,453

3 Claims. (Cl. 116—135)

This invention relates generally to index markers and more specifically to index markers of the variety adapted for slidable mounting on cards carrying indicia. There are numerous applications where it is desirable to employ some sort of an index marker to indicate a selected number or a running total on a cooperating indicia scale. In most of these applications, such an index card and cooperating marker is employed to avoid reliance on one's memory to retain a selected figure or number which appears in the series of numbers carried by the card.

In many games such as baseball or golf, different types of score totalizing devices of this nature have been widely used. In recent years the need for such devices has expanded to new fields, one of which relates to the tendency of people to be particularly attentive to their diets. Medical circles have become increasingly aware of the injury to health resulting from one's failure to maintain a proper body weight. One recognized means of controlling one's weight is through accurate limitation of one's daily calorie consumption. By evaluating a person's weight variations against his calorie intake, it is possible to establish a proper daily calorie level to which he should adhere to maintain, increase, or decrease his weight level. Thus, by counting the number of calories one has been consuming daily under a normal diet, it is possible to make a small percentage change in the calorie consumption to safely and painlessly vary one's weight. But when effecting such close control over the calorie consumption, every item of food eaten must be carefully totaled. Proper diet control is impossible when one simply knows the calorie values of each helping or item of food and does not keep a record of the total caloric consumption.

Many commercial devices have been developed and sold to facilitate the counting and summation of the daily calorie consumption. This counting and summation job is quite tedious inasmuch as it requires evaluating and totaling the calorie content of every portion of food consumed during that period. Since people are normally reluctant to arbitrarily limit their food consumption through dieting, any increased difficulty or burden placed upon them in connection with adhering to the diet influences them to break or deviate from their diet.

It would be extremely desirable, therefore, to have some convenient means to effect the summation of one's daily calorie consumption quickly and easily. It would also be an advantage to have the running total of the calorie consumption readily available at all times so that the consumption for the completed day might approach as nearly as possible to the prescribed quantity of calories.

In line with these recognized goals, it has been found that an indicia carrying card equipped with a plurality of index markers is the most acceptable method of counting, observing, and controlling one's calorie consumption. The indicia carrying card may be designed to correspond in size to a business card so as to be readily receivable in one's pocket, purse, or wallet. Thus, it is available at all times and serves as a reminder for one to adhere to the prescribed diet.

If such a device is to be used effectively and accurately, the index markers carried by the indicia card must be constructed and mounted on the indicia bearing card in such a way that they may be moved easily by one's finger pressure but will not be displaced while being inserted or removed from a pocket or wallet. This latter requirement is somewhat peculiar to this use since many counters of this type are used continuously until the desired total is obtained at which time it is recorded or removed from the card. On the other hand, when counting calories or perhaps a golf score, the indicia markers will be required to remain at a fixed indicating position for periods of non-use.

Since a counting device of this kind is merely a substitute for a pencil and piece of paper which are usually readily available, it must be constructed inexpensively if it is to have an appeal to the general public. If the counting or sum recording device is not marketed for a very low price, the convenience it offers cannot justify the difference in price between it and the paper and pencil and, as a result, it will not sell. Therein lies the primary reason for the failure of index cards of this type to gain any degree of commercial acceptance. The index marker of the instant invention represents an advance over the prior art in that it embodies the advantages of being easily movable and not being susceptible to accidental sliding while at the same time being inexpensive to produce.

It is, therefore, an object of this invention to provide an easily operated, inexpensive sum indicating and totalizing device.

It is a further object of this invention to provide an index marker for use with a sum indicating device which is of improved design and inexpensive to produce and assemble.

It is a further object of this invention to provide an index marker which will remain fixed during periods of non-use but is easily movable to new indexing positions.

It is an additional object of this invention to provide an inexpensive index marker suitable for use on indicia bearing calorie counting cards.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

Fig. 1 is a front view of an indicia bearing card carrying a plurality of index markers;

Fig. 2 is an exploded view in perspective of one of the index markers of Fig. 1;

Fig. 3 is a sectional view taken on line 3—3 of Fig. 2 with the assembly tabs shown in the uncrimped position;

Fig. 4 is a sectional view taken on line 4—4 of Fig. 1; and

Fig. 5 is a sectional view of an alternative embodiment.

A sum indicating or totalizing device to be described is designated generally by the reference numeral 10 and comprises an indicia bearing card 11 which carries the index markers of the instant invention as shown in Fig. 1. The card 11 which may be made of cardboard, plastic or any other suitable wear-resistant material adapted to being formed in thin sheets is rectangular in shape and is provided with a plurality of slots 12 cut out or formed therein. The slots 12 are spaced from the edge of the card and extend parallel to the length of the card. Adjacent each slot and adapted to cooperate therewith, a column of indicia numbers 13 has been printed on the card.

An index marker generally indicated by numeral 14 is slideably mounted in each of the three slots 12. The index markers 14 are thereby adapted to be positioned adjacent to selected numerals of the columns 13. The three markers with their cooperating indicia make it possible to record either three different numerals or a single numeral which is intended to be the sum of the three indicated numerals. When used as a calorie counter, the two index markers towards the left in Fig. 1 are employed to record a single calorie figure representing the number of hundred calories consumed. The index marker farthest to the right in Fig. 1 serves as a type of vernier indicating to the nearest ten calories the quantity which has been consumed over that recorded by the two markers to the left.

Considering now the structure of index marker 14, Fig. 2 shows an exploded view of one of the index markers 14 which is made up of a frontal member 15 and a retaining member 16, which members are crimped together in sliding engagement with the slots 12 as will be explained in greater detail below. The frontal member 15 is substantially diamond shape having assembly tabs 17 and 18 formed on opposed end portions of the diamond-shaped body. One of the side points 19 of the diamond-shaped member serves as the indicating portion of the index marker 14. On the other side of the diamond-shaped member 15, a flatted portion 20 has been formed to reduce the space required for the index markers and indicia columns.

The center portions of the frontal member 15 and the retaining member 16 have spherical deformations 21 provided therein. The sectional views of Figs. 3 and 4 show the shape and extent of the spherical deformations 21. Each deformation 21 provides a finger engaging portion which permits an operator to readily adjust the position of the index marker 14 and may be of any suitable shape so as to create good frictional engagement between one's fingers and the index marker 14. It has been found desirable from the standpoint of ease of fabrication and use to employ the fairly flat spherical shape shown in the drawings. This shape allows the index card to be readily inserted, contained and removed from one's pocket, purse or wallet. The retaining member 16 is substantially symmetrical to the frontal member 15 being of generally diamond shape and having one pointed side 22 and a flatted side 23 as does member 15.

Assembly tabs 24 and 25 are formed on opposite edges of the retaining member 16 and extend outwardly therefrom. The tabs 24 and 25 are positioned to cooperate in assembling relation with the tabs 17 and 18 of the frontal member 15. As shown in Fig. 2, the tabs 24 and 25 are somewhat U-shaped, each having a pair of outwardly extending legs 24a and 25a respectively and bight portions 24b and 25b respectively around which the tabs 17 and 18 are crimped. The assembly tabs 17 and 18 are formed with hook-shaped portions which serve to retain the index marker 14 in assembled position on the card 11 and to guide the marker 14 in the slot 12. The tabs 17 and 18 have downwardly extending legs 17a and 18a respectively which project through the slot 12 in card 11. The legs 17a and 18a are dimensioned to loosely engage the slot 12 and thereby to guide the marker 14 therein.

The end portions of tabs 17 and 18 consist of a pair of crimped ends 17b and 18b which are positioned in a plane parallel to card 11 and extend inwardly towards each other. It can be easily understood that the tabs 17, 18 which are initially flat as shown in Fig. 3 are provided with two approximately right angle bends to form the hook-shaped contour defined by portions 17a, 17b and 18a, 18b respectively. The sectional view of Fig. 4 shows the frontal member 15 and the retaining member 16 in their assembled position with the card 11 assembled therebetween. The spacing of the legs 24a and 25a on each U-shaped tab 24, 25 is such that the leg portions 17a and 18a are snugly received therebetween. The legs 24a and 25a thereby prevent any relative lateral displacement of members 15 and 16 from their assembled position.

To facilitate movement of the assembled index marker on the card 11, the leg portions 24a and 25a of the assembly tabs 24 and 25 have their ends turned up so that the tabs 24, 25 present a well-rounded surface to the card 11. The curved portions of legs 24a and 25a, which contact the card 11, eliminate any possibility of the retaining member 16 digging into the card 11 when being positioned.

An important aspect of the instant invention is the means by which the compressive force exerted by the members 15 and 16 of the index marker 14 on the card 11 is controlled. It should be clear that the above-mentioned force is entirely determined by the position and stresses in the assembly tabs 17, 18 and 24, 25. It has been found that the crimping force applied to the legs 17b and 18b is very critical in establishing a satisfactory compressive force. In addition, the compressive force is very critical in determining the ease or difficulty involved in positioning the index marker 14 on the card 11.

In order to make this crimping force less critical, the assembly tabs 24, 25 are provided with an initial deformation out of the normal plane of contact with card 11 before assembly. This deformation is indicated in the sectional drawing of Fig. 3 by the angle X. The magnitude of the angle depends on the resilience of the material, the length of the tabs, and the compressive force desired. In effect, the tabs 24, 25 act as end-loaded cantilever springs; the crimped tab portions 17b and 18b act as the load on the springs and retaining member 16 as the support. Therefore, by the action of the crimp, the bight portions 24b and 25b of tabs 24, 25 respectively are deformed to the plane of the adjacent side of card 11. Due to this deformataion and the resilience of the tabs 24, 25, an opposing moment or force is exerted by the support or retaining member 16 against the adjacent card 11. This force, which is fairly easy to regulate, is the compressive force exerted on the card by the index marker 14.

Thus, while employing an inexpensive two-piece index marker, a readily controlled compressive force producing means has been provided. It should be understood that good control of said compressive force also results in control of the degree of frictional engagement with the cooperating indicia card. The end result is an inexpensive index marker made entirely of blanked and stamped parts which may be easily assembled to an indicia card so as to retain its position on the card but also be readily repositioned when desired.

Referring to Fig. 5 of the drawings, a sectional view of a more simplified form of the invention is shown. In this embodiment, the index marker 29 is made up of a one-piece metal stamping 30 which requires only a single pair of assembly tabs to slideably mount the index marker in slot 12 of the card 11. The one-piece stamping 30 is made up of a front portion 31 and a rear portion 32, which portions are of the same general shape and contour as the frontal member 15 and retaining member 16 with the exception of the assembly means provided thereon.

The primary difference between the embodiment of Figs. 1 to 4 and Fig. 5 is that the assembly tabs 17 and 24 of the marker 14 have been made integral in a single connecting link 33 which in the index marker 29 unites the front portion 31 and the rear portion 32. The connecting link 33 is of the same width as the assembly tab 17 so as to provide guiding engagement with the walls of slot 12 when assembled to card 11. The assembly tabs which are carried by the front and rear portions 31 and 32 on the edges opposite to the position of connecting link 33 are of similar shape and construction to the assembly tabs 18 and 25 of the marker 14 and are indicated by the same reference numerals in Fig. 5.

It should be understood that by using a progressive die, the stamping 30 may be produced in a single operation whereby the link 33 is formed with a bend of approximately 90°. In this form, the front portion 31 and rear portion 32 will lie in planes normal to each other. In addition, the progressive die partially preforms the hook on assembly tab 18. The form assumed by the tab 18 immediately prior to assembly is such that when the front portion 31 and rear portion 32 of marker 29 are manually pressed into engagement with card 11, the leg 18b of the assembly tab 18 snaps around the bight portion 25b of the assembly tab 25. The assembly of marker 29 may then be readily completed by crimping assembly tab 18 and connecting link 33 to the positions shown in Fig. 5 to apply the compressive force between marker 29 and the card 11.

In view of the detailed description provided above, the simplicity of construction and method of operation of the index markers 14 and 29 will be readily understood by those skilled in the art and no further discussion need be included herewith.

While there has been shown and described two particular embodiments of the present invention, it will be apparent to those skilled in the art that various modifications may be made without departing from the invention in its broader aspects and it is, therefore, aimed in the appended claims to cover all such changes and modifications as fall within the true spirit and scope of the present invention.

What is claimed as new and desired to be secured by Letters Patent of the United States is:

1. An indicating device comprising an indicia carrying card having a narrow, elongated slot formed therein, an index marker including a first body member and a second body member, U-shaped assembly tabs extending outwardly on opposite sides of said first body member, hook-shaped tabs on opposite sides of said second body member, said hook-shaped tabs extending through said slot with their ends in engagement with the bight portions of said U-shaped tabs to slidably retain said first and second body members on opposite sides of said card and one of said body members having an indicating portion cooperating with said indicia.

2. An indicating device comprising an indicia carrying card having an elongated slot formed therein, an index marker including a first body member and a second body member, said body members being substantially flat, U-shaped assembly tabs having legs extending outwardly on opposite sides of said first body member, hook-shaped tabs on opposite sides of said second body member with the ends thereof extending toward each other, said hook-shaped tabs extending through said slot with said ends crimped into retaining engagement with the bight portions of said U-shaped tabs to slidably retain said first and second body members on opposite sides of said card, and one of said body members having an indicating portion cooperating with said indicia.

3. The indicating device of claim 2 wherein said U-shaped tabs are resilient and are retained in a flexed condition by said hook-shaped tabs.

References Cited in the file of this patent

UNITED STATES PATENTS

| | | |
|---|---|---|
| 119,891 | Smith | Oct. 10, 1871 |
| 1,395,094 | Collins | Oct. 25, 1921 |
| 1,445,586 | Gunnlaugsson | Feb. 13, 1923 |
| 1,590,793 | Aitken | June 29, 1926 |
| 2,598,792 | Heine | June 3, 1952 |
| 2,632,962 | Jacobson et al. | Mar. 31, 1953 |

FOREIGN PATENTS

| | | |
|---|---|---|
| 242,067 | Great Britain | Nov. 5, 1925 |